US007987768B2

(12) United States Patent
Green et al.

(10) Patent No.: US 7,987,768 B2
(45) Date of Patent: Aug. 2, 2011

(54) BREWING MECHANISM

(75) Inventors: Charles Bradley Green, Dacula, GA (US); Paul A. Phillips, Marietta, GA (US)

(73) Assignee: The Coca-Cola Company, Atlanta, GA (US)

( * ) Notice: Subject to any disclaimer, the term of this patent is extended or adjusted under 35 U.S.C. 154(b) by 682 days.

(21) Appl. No.: 12/056,394

(22) Filed: Mar. 27, 2008

(65) Prior Publication Data
US 2009/0242070 A1 Oct. 1, 2009

(51) Int. Cl.
*A47J 31/40* (2006.01)
*B65G 59/00* (2006.01)

(52) U.S. Cl. ......... 99/280; 99/316; 99/302 R; 99/289 P; 99/289 R; 99/295; 99/291; 221/199; 221/309; 221/92; 221/113; 221/119; 221/120; 221/121

(58) Field of Classification Search ............... 99/280, 99/316, 302 R, 289 P, 289 R, 295, 291; 221/199, 221/309, 92, 113, 119, 120–121
See application file for complete search history.

(56) References Cited

U.S. PATENT DOCUMENTS

| | | | |
|---|---|---|---|
| 2,283,967 A | 5/1942 | Brown | |
| 2,968,560 A | 1/1961 | Goros | |
| 3,589,272 A | 6/1971 | Bouladon et al. | |
| 3,811,373 A | 5/1974 | Telco | |
| 3,812,273 A | 5/1974 | Schmidt | |
| 3,823,656 A | 7/1974 | Vander Veken | |
| 3,952,641 A | 4/1976 | Vitous | |
| 3,985,069 A | 10/1976 | Cavalluzzi | |
| 4,254,694 A | 3/1981 | Illy | |
| 4,258,330 A | 3/1981 | Kaneko et al. | |
| 4,429,623 A | 2/1984 | Illy | |
| 4,471,689 A | 9/1984 | Piana | |
| 4,581,239 A | 4/1986 | Woolman et al. | |
| 4,644,855 A | 2/1987 | Woolman et al. | |
| 4,829,889 A | 5/1989 | Takeuchi et al. | |
| 4,846,052 A | 7/1989 | Favre et al. | |
| 4,860,645 A | 8/1989 | van der Lijn et al. | |
| 4,886,674 A | 12/1989 | Seward et al. | |
| 4,921,712 A | 5/1990 | Malmquist | |
| 4,941,399 A | 7/1990 | Zucchetti | |
| 4,995,310 A | 2/1991 | van der Lijn et al. | |
| 4,995,978 A | 2/1991 | Van de Gang | |
| 5,134,924 A | 8/1992 | Vicker | |
| 5,190,652 A | 3/1993 | van Thoor et al. | |
| 5,197,374 A | 3/1993 | Fond | |
| 5,242,702 A | 9/1993 | Fond | |
| 5,325,765 A | 7/1994 | Sylvan et al. | |
| 5,343,799 A | 9/1994 | Fond | |
| 5,347,916 A | 9/1994 | Fond et al. | |

(Continued)

FOREIGN PATENT DOCUMENTS

BE  701863  2/1968

(Continued)

*Primary Examiner* — Shawntina Fuqua
(74) *Attorney, Agent, or Firm* — Sutherland Asbill & Brennan, LLP

(57) ABSTRACT

A dispensing system for injecting a fluid into a number of containers. The dispensing system may include a turret plate for holding the containers and an injection system positioned about the turret plate. The injection system may include a piston for contacting a container. The piston may include an injection surface in communication with an internal spring such that the internal spring forces the injection surface against the container.

19 Claims, 7 Drawing Sheets

U.S. PATENT DOCUMENTS

| | | | |
|---|---|---|---|
| 5,398,595 | A | 3/1995 | Fond et al. |
| 5,398,596 | A | 3/1995 | Fond |
| 5,402,707 | A | 4/1995 | Fond et al. |
| 5,472,719 | A | 12/1995 | Favre |
| 5,505,120 | A | 4/1996 | Albertson |
| 5,582,730 | A | 12/1996 | Hugentobler |
| 5,637,335 | A | 6/1997 | Fond et al. |
| 5,638,741 | A | 6/1997 | Cisaria |
| 5,656,311 | A | 8/1997 | Fond |
| 5,840,189 | A | 11/1998 | Sylvan et al. |
| 5,855,161 | A | 1/1999 | Cortese |
| 5,897,899 | A | 4/1999 | Fond |
| 5,948,455 | A | 9/1999 | Schaeffer et al. |
| 5,992,298 | A | 11/1999 | Illy et al. |
| 6,079,315 | A | 6/2000 | Beaulieu et al. |
| 6,082,247 | A | 7/2000 | Beaulieu |
| 6,095,032 | A | 8/2000 | Barnett et al. |
| 6,103,116 | A | 8/2000 | Koslow et al. |
| 6,142,063 | A | 11/2000 | Beaulieu et al. |
| 6,182,554 | B1 | 2/2001 | Beaulieu et al. |
| 6,186,051 | B1 | 2/2001 | Aarts |
| 6,440,256 | B1 | 8/2002 | Gordon et al. |
| 6,517,880 | B2 | 2/2003 | Walters, Jr. et al. |
| 6,589,577 | B2 | 7/2003 | Lazaris et al. |
| 6,786,134 | B2 | 9/2004 | Green |
| 6,941,855 | B2 * | 9/2005 | Denisart et al. .............. 99/289 R |
| 2001/0052294 | A1 | 12/2001 | Schmed |
| 2002/0059870 | A1 | 5/2002 | Walters, Jr. et al. |
| 2003/0145736 | A1 | 8/2003 | Green |
| 2004/0255790 | A1 | 12/2004 | Green |
| 2005/0095158 | A1 | 5/2005 | Kirschner et al. |
| 2005/0183581 | A1 | 8/2005 | Kirschner |
| 2005/0188854 | A1 | 9/2005 | Green et al. |
| 2005/0241489 | A1 | 11/2005 | Kirschner |
| 2006/0196364 | A1 | 9/2006 | Kirschner |
| 2008/0028948 | A1 | 2/2008 | Kirschner |

FOREIGN PATENT DOCUMENTS

| | | | |
|---|---|---|---|
| EP | 0326099 | A1 | 1/1989 |
| EP | 0780307 | A1 | 10/1996 |
| EP | 0780310 | A1 | 10/1996 |
| EP | 0780370 | A3 | 10/1996 |
| EP | 0896930 | A1 | 2/1999 |
| EP | 1042978 | A1 | 4/2000 |
| FR | 2 617 389 | | 1/1989 |
| WO | 93/17932 | | 9/1993 |
| WO | 98/23196 | A1 | 11/1996 |
| WO | 01/60220 | A1 | 2/2001 |
| WO | 01/60712 | A1 | 2/2001 |

* cited by examiner

BREWING MECHANISM

TECHNICAL FIELD

The present application relates generally to beverage dispensers and more particularly relates to a brewing mechanism having an injection mechanism that cooperates with a removable, rotating turret plate to produce high quality beverages such as coffee and tea from material pods or other types of containers.

BACKGROUND OF THE INVENTION

Several different types of beverage brewing systems are known in the art. For example, percolators and drip-type coffee makers have long been used to make regular or "American"-type coffee. Hot water may be passed through a container of coffee grinds or other materials so as to brew the coffee. The coffee then drips into a pot or a cup. Likewise, pressure-based devices have long been used to make espresso-type beverages. Hot, pressurized water may be forced through the espresso grinds or other materials so as to brew the espresso. The espresso then may flow into the cup. Many other types of brewing systems are in use.

One of the drawbacks with these known brewing systems may focus on their use in high volume restaurants or other types of retail outlets. For example, a high quality espresso beverage simply may take too much time to brew with conventional equipment in a high volume restaurant. Similarly, the amount of time it may take to seep a cup of tea also may be too long. As a result, the beverage may be inferior or a customer may choose to go elsewhere for his or her brewed beverage.

Further, although regular or American coffee may be made in sufficient quantities for a high volume restaurant or in any other type of establishment, the customer may prefer a freshly brewed beverage immediately at that time and at that location. Brewing smaller amounts of coffee or other beverages, however, may not be practical or economical from a time or a volume point of view for the restaurant or other type of establishment.

A single serving coffee and tea dispenser is shown in commonly owned U.S. Pat. No. 6,786,134 to Green, entitled "Coffee and Tea Dispenser." This patent describes and claims a beverage system with a transport assembly, a loading assembly, an injection station, and an ejection station. The disclosure of U.S. Pat. No. 6,786,134 is incorporated herein by reference in full. Specifically, the patent shows the use an injector head maneuverable about an injection frame via a support plate, an idler wheel, and an eccentric cam. Likewise, the ejector system uses a lift pad operated via a solenoid and a sweep arm. Although such a device provides single servings of coffee, tea, or other types of quality beverages in an efficient time frame, there is a desire to develop further the components of the dispenser described therein.

SUMMARY OF THE INVENTION

The present application thus describes a dispensing system for injecting a fluid into a number of containers. The dispensing system may include a turret plate for holding the containers and an injection system positioned about the turret plate. The injection system may include a piston for contacting a container. The piston may include an injection surface in communication with an internal spring such that the internal spring forces the injection surface against the container.

The injection system may include an eccentric cam in communication with the piston. The eccentric cam may be driven by a micro-switch cam. The micro-switch cam may include a number of detents and a limit switch. The injection surface may include a gasket and an injection port positioned therein. The internal spring may include a preloaded spring.

The dispensing system further may include a pair of calipers and the turret plate may be positioned between the pair of calipers via a turret pin. The turret pin may be held in place about the turret plate via a spring loaded bracket. The dispensing system further may include a turret plate drive motor and the turret plate may include gear teeth in communication with the drive motor.

The dispensing system further may include an ejection system positioned about the turret plate. The turret plate may include a number of turret plate apertures therein and the ejection system may include a number of ejector arms such that rotation of the turret plate causes the number of ejector arms to rotate. The number of ejector arms extends into the turret plate apertures as the turret plate rotates. The ejection system also may include a pod guide and a pod aperture.

The present application further describes a dispensing system for injecting a fluid into a number of containers. The dispensing system may include a turret plate for holding the number of containers within a number of turret plate apertures, an injection system positioned about the turret plate, and an ejection system positioned about the turret plate. The ejection system may include a number of ejector arms positioned about the turret plate apertures such that rotation of the ejector arms causes one of the number of containers to be ejected from one of the turret plate apertures. Rotation of the turret plate causes the number of ejector arms to rotate. The ejection system may include a pod guide and a pod aperture positioned about the turret plate.

The present application further describes a method for injecting a fluid into a number of containers. The method may include positioning the number of containers about a turret plate, rotating a first container about a spring loaded injection piston, forcing the spring loaded injection piston onto the first container via rotation of an eccentric cam, injecting the fluid into the container, further rotating the turret plate, and ejecting the first container. Rotating the turret plate may include rotating a number of ejector arms. Rotating the number of ejector arms causes ejection of the first container.

These and other features of the present application will become apparent to one of ordinary skill in the art upon review of the following detail description when taken in conjunction with the drawings and the appended claims.

DETAILED DESCRIPTION

Figure 1:
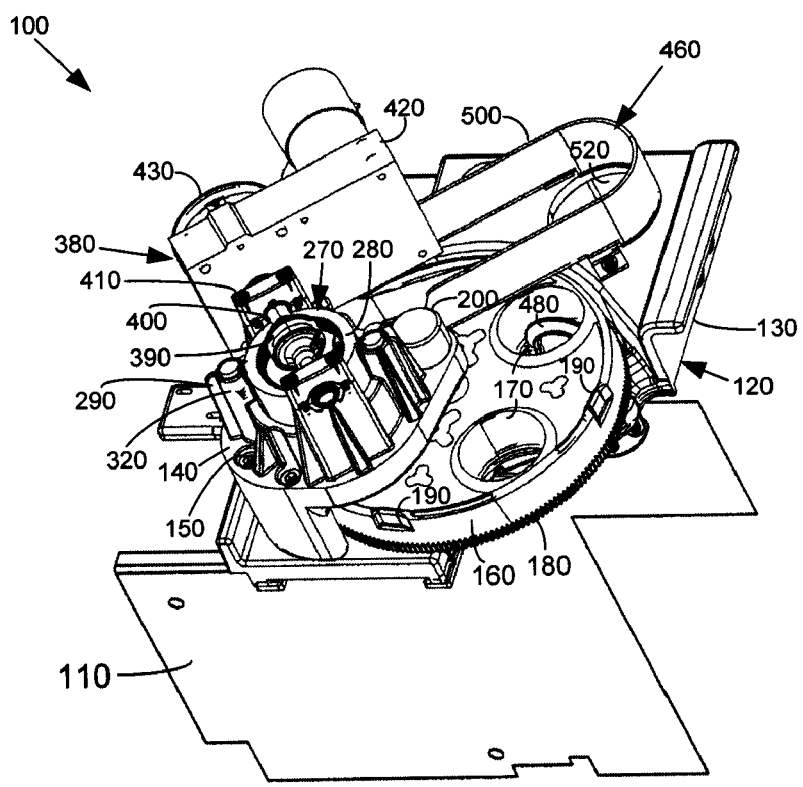
FIG. 1 is a top perspective view of the brewing mechanism as is described herein.
Figure 2:
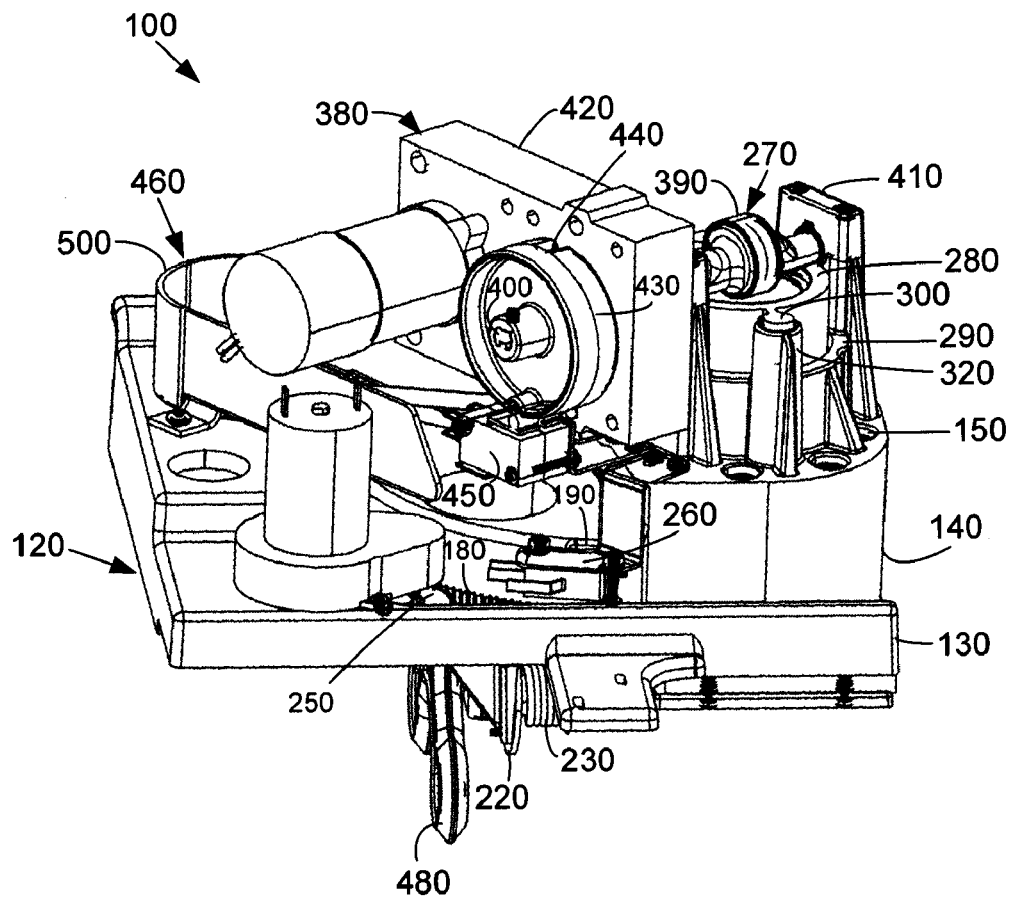
FIG. 2 is a further top perspective view of the brewing mechanism of FIG. 1.
Figure 3:
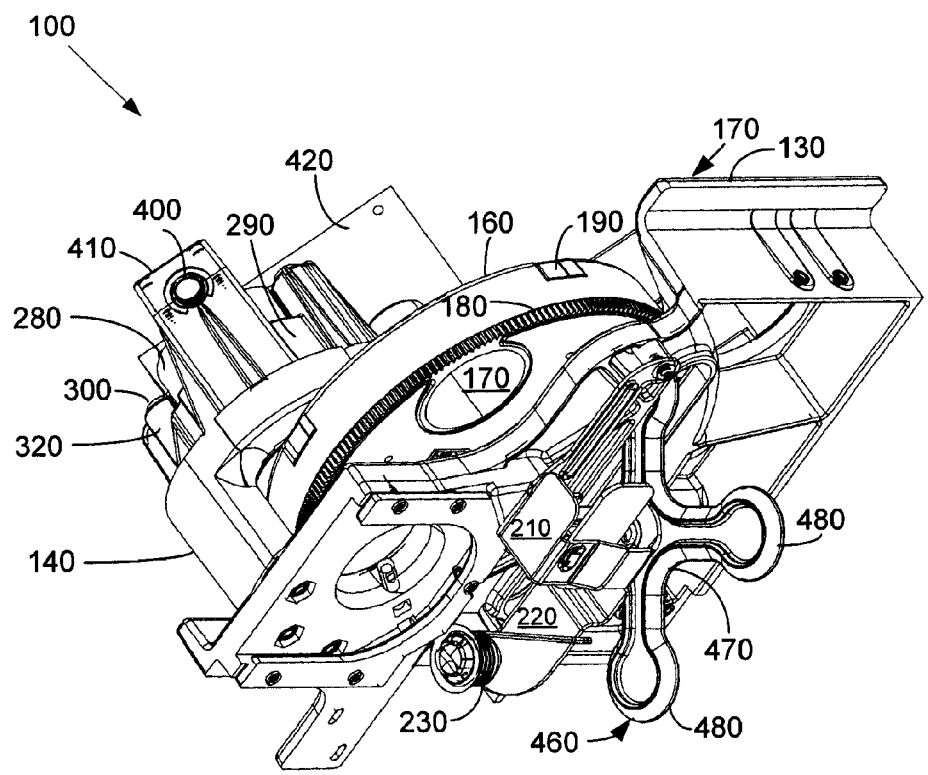
FIG. 3 is a bottom perspective view of the brewing mechanism of FIG. 1.
Figure 4:
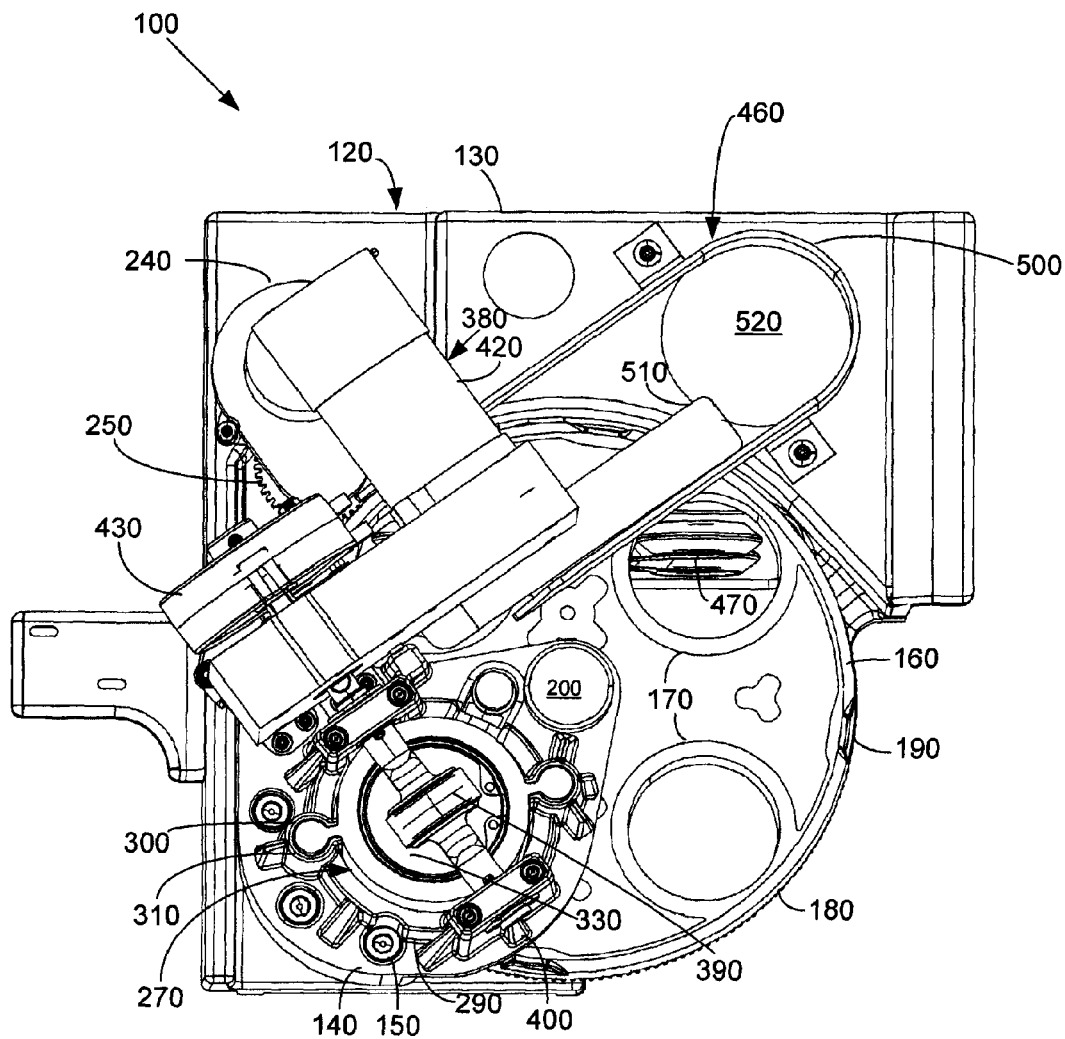
FIG. 4 is a top plan view of the brewing mechanism of FIG. 1.
Figure 5:
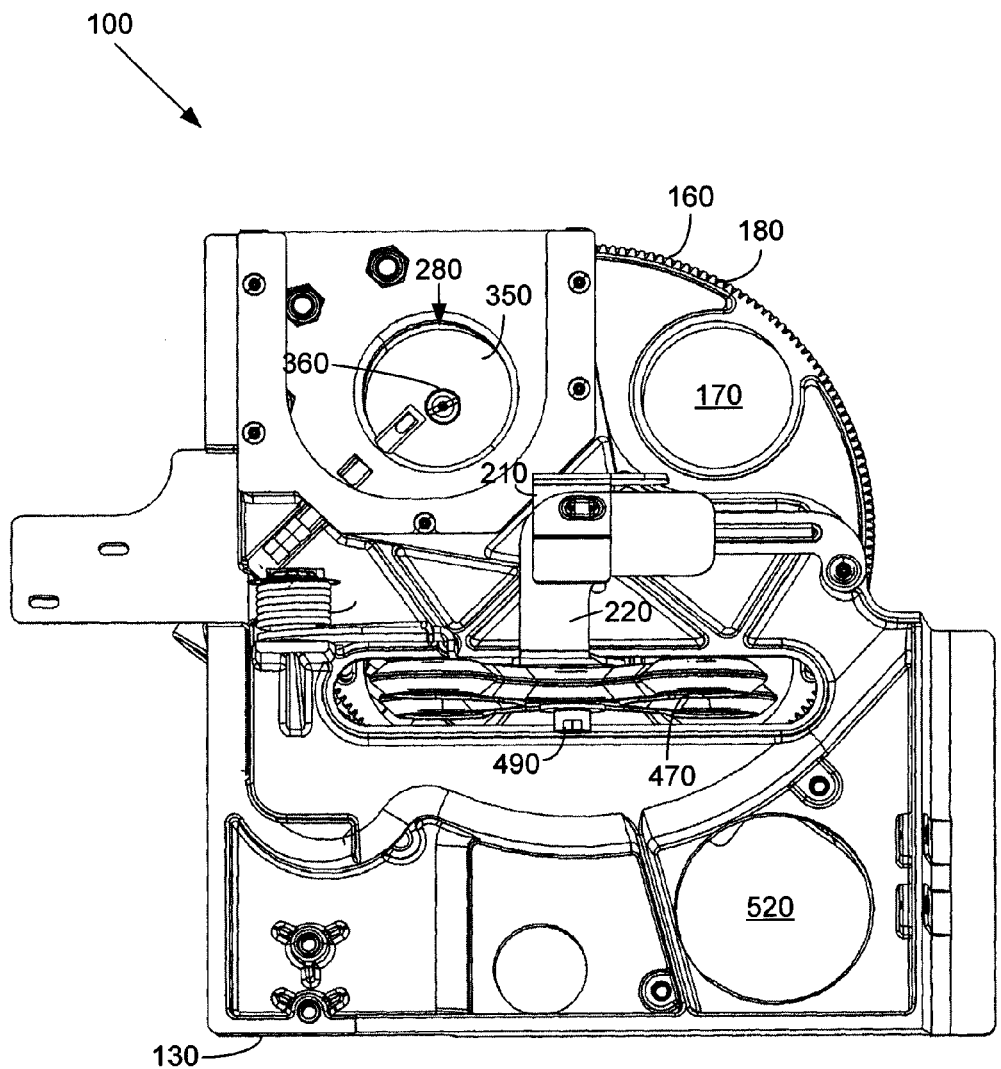
FIG. 5 is a bottom plan view of the brewing mechanism of FIG. 1.

Referring now to the drawings, in which like numerals refer to like parts throughout the several views, FIGS. 1-5 show a brewing mechanism 100 as is described herein. Although the term "brewing mechanism" is used, the device described herein may be used in any process involving the injection of a fluid or other substance into a number of containers. The brewing mechanism 100 also may be used with other components of a coffee and tea dispenser or other type of dispenser such as those described in U.S. Pat. No. 6,786,134 referenced above. These other systems may include, without limitation, a water control system with boiler, a loading assembly, various types of control means, and other systems. Similar dispensing systems for use herewith may include U.S. Publication No. 2004/0255790 to Green, entitled "Coffee and Tea Dispenser" and U.S. Publication No. 2005/0188854 to Green, entitled "Coffee and Tea Dispenser." The disclosures of these patents and applications are incorporated herein by reference in full. Similar systems may be used herewith. The brewing mechanism 100 may be attached to these other systems via a boiler guard 110 or similar types of attachment means. The boiler guard 110 is shown in FIG. 1 but removed from the remaining figures for a clear view of the other components of the brewing mechanism 100.

Figure 7A:
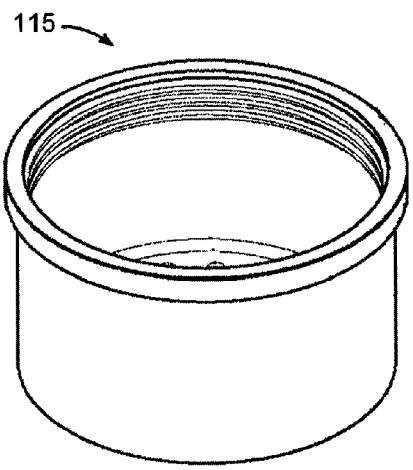
FIGS. 7A-7C are perspective views of a pod that may be used with the brewing mechanism of FIG. 1.
Figure 7B:
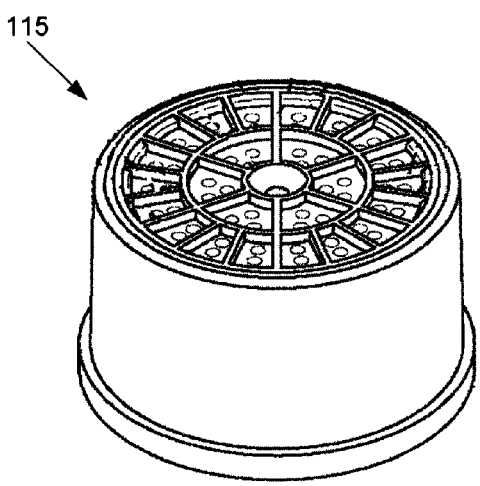
Figure 7C:
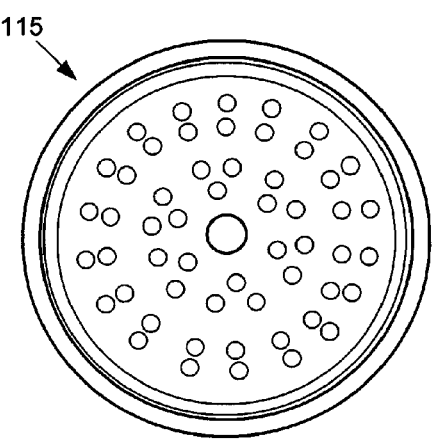

The brewing mechanism 100 may be used with a number of material pods 115 or other types of containers. An example of a pod 115 usable herein is shown in FIGS. 7A-7C and in commonly owned U.S. Pat. No. 6,948,420 to Kirschner, entitled "Coffee and Tea Pod." Similar pods are shown in commonly owned U.S. Publication No. 2005/0183581 to Kirschner, entitled "Coffee and Tea Pod"; U.S. Publication No. 2005/0241489 to Kirschner, entitled "Coffee and Tea Pod" (now allowed); U.S. Publication No. 2006/0196364 to Kirschner, entitled "Coffee and Tea Pod"; U.S. Publication No. 2007/0181005 to Kirschner, entitled "System for Varying Coffee Intensity"; U.S. Publication No. 2008/0028948 to Kirschner, entitled "Pod for Dispersible Materials", and similar types of devices. The disclosures of these patent and applications are incorporated herein by reference in full. Other or multiple types of containers may be used herein.

The brewing mechanism 100 may include a base 120. The base 120 may include a lower caliper 130 and an upper caliper 140. The lower and upper calipers 130, 140 may be made out of a molded plastic or any conventional type of material. The lower and upper calipers 130, 140 may be molded or formed with a number of compartments for mounting the components described below or as may be desired. The lower and upper calipers 130, 140 may be connected by a number of bolts 150 or other types of connection means.

The brewing mechanism 100 may include a turret plate 160 positioned between the lower and upper calipers 130, 140. The turret plate 160 may be largely disc like in shape although other shapes may be used herein. The turret plate 160 may be made from a molded plastic, convention metals such as stainless steel or aluminum, or similar types of substantially non-corrosive materials. The turret plate 160 may include a number of pod apertures 170 positioned therethrough. The pod apertures 170 may be sized to accommodate the material pods 115 as described above or other types of containers. The size and the number of the pod apertures 170 may vary. The turret plate 160 may have a number of gear teeth 180 formed therein or applied thereon. The gear teeth 180 may be used to drive the turret plate 160 as will be described in more detail below.

The turret plate 160 also may have a number of detents formed therein or applied thereon. The detents 190 may be used to control the advance of the turret plate 160 as will be described in more detail below. Other types of control or drive means may be used herein.

The turret plate 160 may be positioned on and rotate about a turret pin 200 extending therethrough. The turret pin 200 may extend through the upper caliper 140, the turret plate 160, the lower caliper 130, and be positioned about a pin clip 210 and a wheel bracket 220. The turret pin 200 may be made out of thermoplastics, conventional metals, or other types of substantially non-corrosive materials. The turret pin 200 may cooperate with the pin clip 210 and the wheel bracket 220 for insertion and removal. The pin clip 210 and the wheel bracket 220 may be mounted on to the lower caliper 130. One end of the wheel bracket 220 may be positioned between the end of the turret pin 200 and the pin clip 210. The other end of the wheel bracket 220 may be spring loaded with a spring 230. Pushing down on the wheel bracket 220 allows the turret pin 200 to be removed from the pin clip 210 and the brewing mechanism 100 as a whole. The spring 230 then forces the wheel bracket 220 and the pin clip 210 back into a locked position.

Positioned on the lower caliper 130 may be a turret plate drive motor 240. The turret plate drive motor 240 may be conventional DC motor or similar type of electrical drive device. The turret plate drive motor 240 may be in communication with a gear wheel 250. The gear wheel 250 may be of conventional design. The gear wheel 250 may mesh with the gear teeth 180 of the turret plate 160 for rotation therewith. Other types of drive means may be used herein.

Positioned on the lower caliper 130 may be a turret plate limit switch 260. The limit switch 260 may be in communication with the drive motor 240 and may cooperate with the detents 190 on the turret plate 160 so as to control the advance of the turret plate 160. The limit switch 260 may be a conventional touch switch. Similar types of control means may be used herein. The turret plate drive motor 240 will advance the turret plate 160 until the next detent 190 is reach as determined by the limit switch 260.

Figure 6:
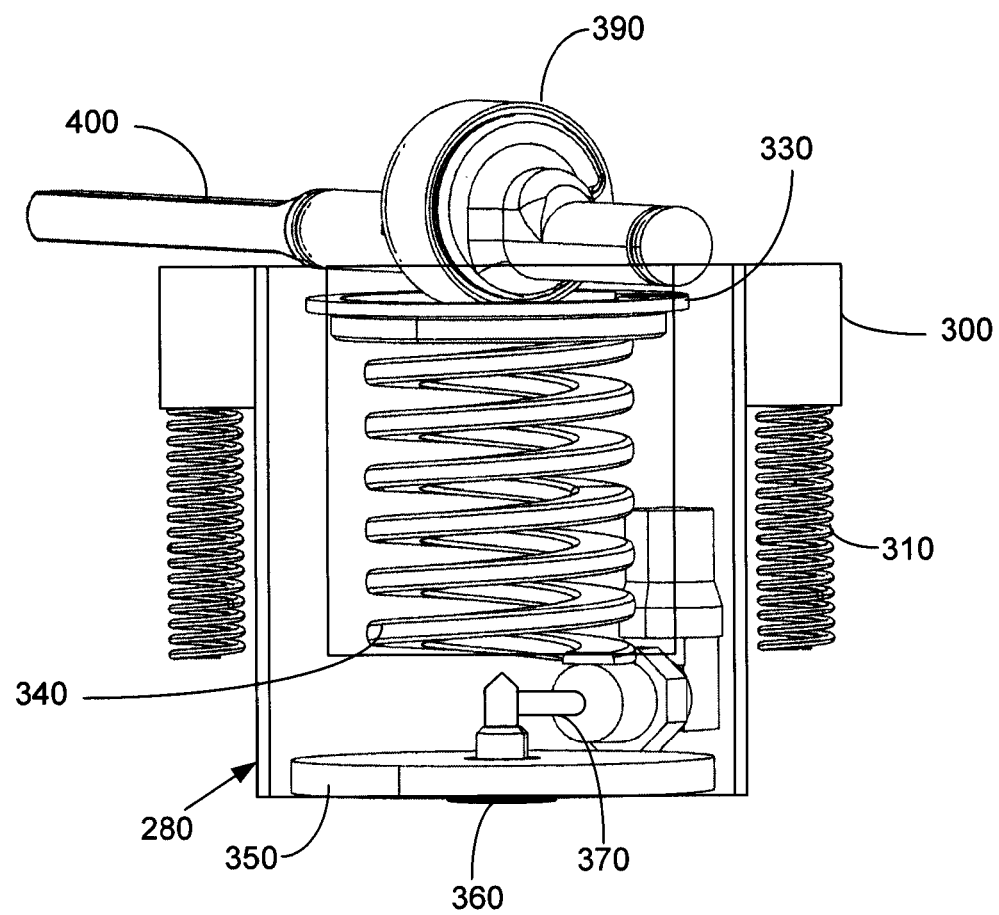
FIG. 6 is a side perspective view of an injection system of the brewing mechanism of FIG. 1 with the piston shown in transparent lines.

The brew mechanism 100 further includes an injection system 270 mounted onto the upper caliper 140. The injection system 270 may includes a piston 280 positioned within a piston mold 290 of the upper caliper 140. The piston 280 may be made out of a molded plastic or similar types of materials. As is shown in FIG. 6, the piston 280 may be largely circular in shape with a pair of slides 300 on either side. The slides 300 may include a slide spring 310 therein. The slides 300 may be positioned within a slide guide 320 that is part of the piston mold 290. The slide guide 320 allows the piston 280 to maneuver up and down within the piston mold 290. The piston 280 may include an upper plate 330, an internal spring 340, and a lower gasket 350. An injection port 360 may be positioned within the lower gasket 350. The injection port 360 may be in communication with a high pressure conduit 370. The injection port 360 may deliver fluid to the pods 115 via the high pressure conduit 370.

The injection system 270 also may include an injection drive system 380. The injection drive system 380 may include an eccentric cam 390. The eccentric cam 390 may be in communication with the upper plate 330 of the piston 280 for movement therewith. The eccentric cam 390 may be positioned on a driveshaft 400. The driveshaft 400 may be positioned within a number of retainers 410. The retainers 410 may be positioned about the piston mold 290 of the upper caliper 140. The driveshaft 400 may be driven by a drive motor 420. The drive motor 420 may be a convention DC motor similar to the turret plate drive motor 240 described above or a similar type of electrical drive device.

The drive motor 420 may be controlled by a micro-switch cam 430. The micro-switch cam 430 may have a number of detents 440 positioned thereon. The micro-switch cam 430 cooperates with a micro-switch 450. The micro-switch 450 also is positioned on the upper caliper 140. The micro-switch 450 may be a convention touch switch. Other types of control means may be used herein. The drive motor 420 advances the driveshaft 400 and the micro-switch cam 430 until the next detent 440 is reached.

Rotation of the driveshaft 400 also rotates the eccentric cam 390. The rotation of the eccentric cam 390 causes the piston 280 to move downward such that the lower gasket 350 and the injection port 360 may contact a pod 115 or another type of container. The force of the piston 280 creates a seal about the gasket 350 and the pod 115. The internal spring 340 is preloaded so as to eliminate the need for adjustments and also prevents binding. The flexibility of the drive system 380 is in contrast to the fixed linkages used in U.S. Pat. No. 6,786,134 described above. The use of the fixed linkages generally required periodic adjustments to maintain a proper seal and proper operation. Further rotation of the driveshaft 400 raises the piston 280 out of contact with the pod 115.

The brewing mechanism 100 also may include an ejection system 460. The ejection system 460 may include an ejector wheel 470 positioned underneath the lower caliper 130. The ejector wheel 470 may be largely star like in shape with four ejector arms 480. Any number of arms 480 may be used. The ejector wheel 470 may be connected to the wheel bracket 220 via a wheel shaft 490. The ejector arms 480 extend underneath and into the pod apertures 170 of the turret plate 160. Interaction between the turret plate apertures 170 and the ejector arms 480 causes the ejector wheel 470 to rotate as the turret plate 160 rotates. The ejector wheel 470 and the ejector system 460 thus may be self propelled. Such a self-propelled system 460 is in contrast to the electrical/mechanical systems shown in U.S. Pat. No. 6,786,134 described above and the associated control systems. The length of the ejector arms 480 also is sufficient such that the ejector arms 480 push a pod 115 or other object within the apertures 170 upward as the ejector arms 480 and the turret plate 160 rotate.

The ejection system 460 also may include a pod guide 500. The pod guide 500 may be a largely U-shaped extended shape. Other shapes may be used herein. The pod guide 500 may be positioned on the upper caliper 140. The ejector wheel 470 and the pod guide 500 may be positioned such that as the turret plate 160 rotates and the ejector arms 480 eject a pod 115 or other object out of the pod apertures 170, the pod 115 falls over the pod guide 500. Within the pod guide 500 may be a pod stabilizer 510. The pod stabilizer 510 may be a downward ramp positioned within the pod guide 500. The pod stabilizer 510 may lead to an extended ejection port 520. As the pods 115 fall within the pod guide 500, the pods 115 may slide down the pod stabilizer 510 and out via the ejection port 520.

In use, the brewing mechanism 100 may be used to brew coffee, tea, or other beverages by advancing pods 115 or other containers within the turret plate 170, adding water or other diluents via the injection system 270, and then ejecting the pods 115 with the ejection system 460. Specifically, a number of pods 115 may be positioned within the pod apertures 170 of the turret plate 160. The turret plate 160 may be advanced by the turret plate drive motor 240 in connection with the limit switch 260.

As each pod 115 is positioned about the injection system 270, the pod 115 may be contacted via the piston 280. Hot pressurized water may be passed through the pod 115 via the injection port 360. The piston 280 may be positioned via the injection drive system 380 such that the eccentric cam 390 forces the upper plate 330 to maneuver the lower gasket 350 into position about the pod 115. The eccentric cam 390 may be driven by the driveshaft 400 via the drive motor 420 under the control of the micro-switch cam 430 and the micro-switch 450. The piston 280 stays in position about the pod 115 until a sufficient amount of water has passed therethrough. The injection drive system 380 then continues rotation of the eccentric cam 390 such that the piston 280 returns to its original position.

The turret plate 160 then rotates through the next station until the spent pod 115 comes into contact with the ejection system 460. The ejector arms 480 of the ejector wheel 470 force the pod 115 up and out of the pod aperture 170, into the pod guide 500, down the pod stabilizer 520, and out via the ejection port 520. The pods 115 may then be disposed of or recycled in a conventional manner.

It should be apparent that the foregoing relates only to the preferred embodiments of the present application and that numerous changes and modifications may be made herein by one of ordinary skill in the art without departing from the general spirit and scope of the invention as defined by the following claims and the equivalents thereof.

We claim:

1. A dispensing system for injecting a fluid into a number of containers, comprising:
    a turret plate for holding the number of containers;
    an injection system positioned about the turret plate;
    the injection system comprising a piston for contacting a container;
    the piston comprising an injection surface in communication with an internal spring such that the internal spring forces the injection surface against the container.

2. The dispensing system of claim 1, wherein the injection system comprises an eccentric cam in communication with the piston.

3. The dispensing system of claim 2, wherein the eccentric cam is driven by a micro-switch cam.

4. The dispensing system of claim 3, wherein the micro-switch cam comprises a plurality of detents and a limit switch.

5. The dispensing system of claim 1, wherein the injection surface comprises a gasket.

6. The dispensing system of claim 1, wherein the injection surface comprises an injection port positioned therein.

7. The dispensing system of claim 1, wherein the internal spring comprises a preloaded spring.

8. The dispensing system of claim 1, further comprising a pair of calipers and wherein the turret plate is positioned between the pair of calipers via a turret pin.

9. The dispensing system of claim 8, wherein the turret pin is held in place about the turret plate via a spring loaded bracket.

10. The dispensing system of claim 1, further comprising a turret plate drive motor and wherein the turret plate comprises gear teeth in communication with the drive motor.

11. The dispensing system of claim 1, further comprising an ejection system positioned about the turret plate.

12. The dispensing system of claim 11, wherein turret plate comprises a plurality of turret plate apertures therein and wherein the ejection system comprises a plurality of ejector arms such that rotation of the turret plate causes the plurality of ejector arms to rotate.

13. The dispensing system of claim 12, wherein the plurality of ejector arms extends into the plurality of turret plate apertures as the turret plate rotates.

14. The dispensing system of claim 11, wherein the ejection system comprises a pod guide and a pod aperture.

15. A dispensing system for injecting a fluid into a number of containers, comprising:
a turret plate for holding the number of containers within a plurality of turret plate apertures;
an injection system positioned about the turret plate;
an ejection system positioned about the turret plate;
the ejection system comprising a plurality of ejector arms positioned about the plurality of turret plate apertures such that rotation of the plurality of ejector arms causes one of the number of containers to be ejected from one of the plurality of turret plate apertures.

16. The dispensing system of claim 15, wherein rotation of the turret plate causes the plurality of ejector arms to rotate.

17. The dispensing system of claim 15, wherein the ejection system comprises a pod guide and a pod aperture positioned about the turret plate.

18. A method for injecting a fluid into a number of containers, comprising:
positioning the number of containers about a turret plate;
rotating a first container about a spring loaded injection piston;
forcing the spring loaded injection piston onto the first container via rotation of an eccentric cam;
injecting the fluid into the container;
further rotating the turret plate;
rotating a plurality of ejector arms; and
ejecting the first container.

19. The method for injection a fluid into a number of containers of claim 18, wherein rotating the plurality of ejector arms causes ejection of the first container.

* * * * *